US012792331B2

(12) United States Patent
Dekarz

(10) Patent No.: US 12,792,331 B2
(45) Date of Patent: Nov. 10, 2026

(54) PROVIDING DEVICE-SPECIFIC FIRMWARE FOR EMBEDDED DEVICES

(71) Applicant: BASLER AG, Ahrensburg (DE)

(72) Inventor: Jens Dekarz, Bad Oldesloe (DE)

(73) Assignee: BASLER AG, Ahrensburg (DE)

( * ) Notice: Subject to any disclaimer, the term of this patent is extended or adjusted under 35 U.S.C. 154(b) by 177 days.

(21) Appl. No.: 18/560,857

(22) PCT Filed: May 24, 2022

(86) PCT No.: PCT/EP2022/064115
§ 371 (c)(1),
(2) Date: Nov. 14, 2023

(87) PCT Pub. No.: WO2022/248504
PCT Pub. Date: Dec. 1, 2022

(65) Prior Publication Data
US 2024/0362004 A1 Oct. 31, 2024

(30) Foreign Application Priority Data
May 26, 2021 (DE) ..................... 10 2021 113 585.0

(51) Int. Cl.
*H04L 29/06* (2006.01)
*G06F 8/36* (2018.01)
(Continued)

(52) U.S. Cl.
CPC .................. *G06F 8/61* (2013.01); *G06F 8/36* (2013.01); *G06F 8/41* (2013.01)

(58) Field of Classification Search
None
See application file for complete search history.

(56) References Cited

U.S. PATENT DOCUMENTS 7,987,269 B1 * 7/2011 Mayhead ............... G06Q 10/06 709/218
2002/0073304 A1 * 6/2002 Marsh ....................... G06F 8/65 713/1

(Continued)

OTHER PUBLICATIONS

PCT International Search Report and Written Opinion, PCT/EP2022/064115, Sep. 23, 2022, 18 pages.

*Primary Examiner* — S. Sough
*Assistant Examiner* — Mohammad H Kabir
(74) *Attorney, Agent, or Firm* — QUARLES & BRADY LLP

(57) ABSTRACT

A system and method for creating individual firmware for an embedded device includes providing a provisioning service comprising a library of predetermined source code modules in which functionalities from a predetermined catalog are implemented, wherein a user of the embedded device is excluded from reading access to the source code modules. The method can also include receiving, from at least one requester, by the provisioning service, a selection of functionalities to be provided in the individual firmware from the predetermined catalog of available functionalities and translating this selection into instructions for compiling associated source code modules into machine code modules by the provisioning service such that the union set of machine code modules provides the functionalities from the selection. The method can further include executing the instructions for compilation by the provisioning service, generating the individual firmware using the machine code modules created during compilation by the provisioning service, and transmitting the individual firmware from the provisioning service to the user of the embedded device, and/or directly to the embedded device.

13 Claims, 3 Drawing Sheets

Figure 1:
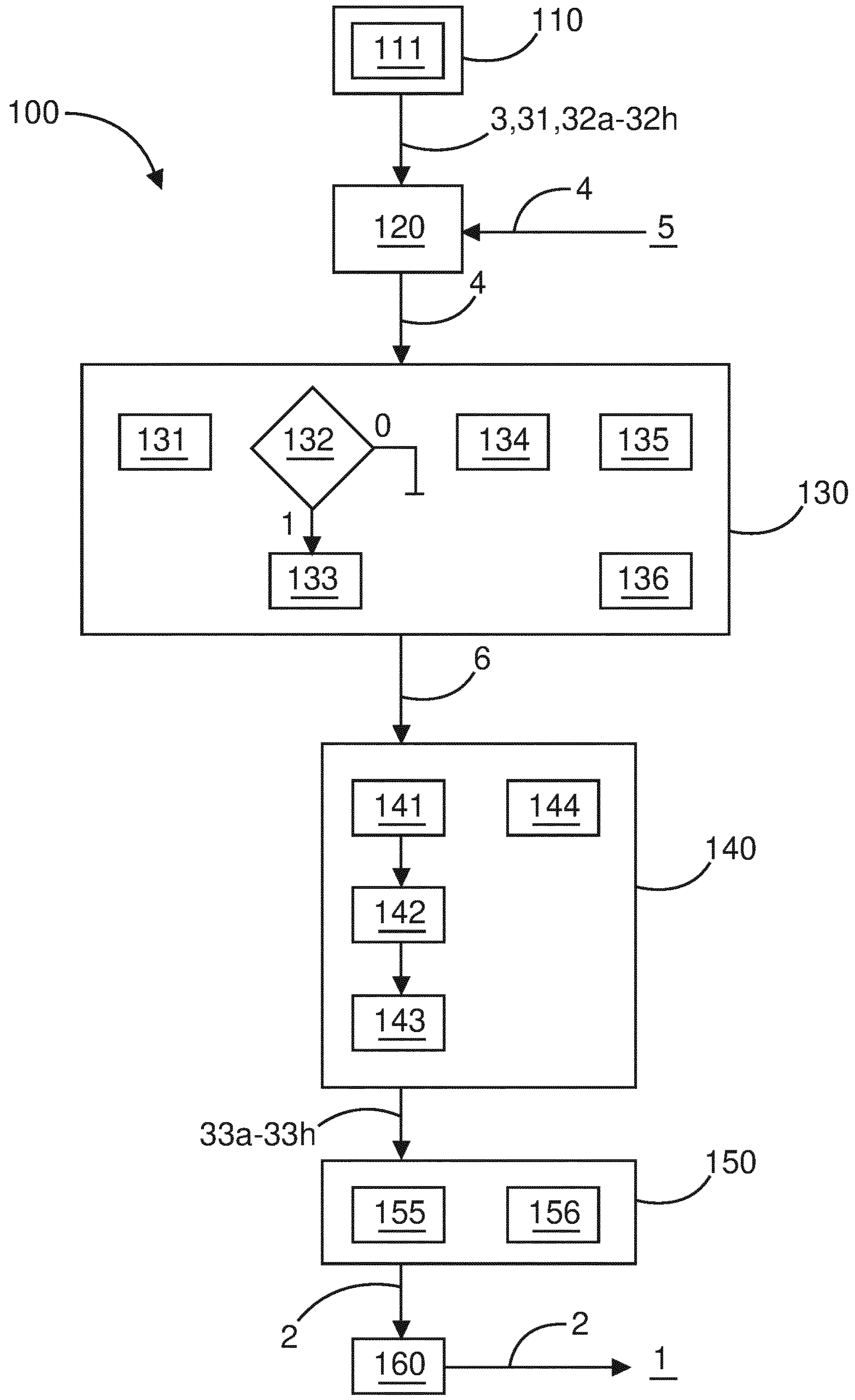

(51) Int. Cl.
*G06F 8/41* (2018.01)
*G06F 8/61* (2018.01)
*G06F 15/173* (2006.01)

(56) References Cited

U.S. PATENT DOCUMENTS

| | | | | |
|---|---|---|---|---|
| 2015/0052596 | A1 | 2/2015 | Ayanam et al. | |
| 2019/0149430 | A1 | 5/2019 | An et al. | |
| 2021/0011703 | A1 | 1/2021 | Rajbharti et al. | |
| 2022/0091826 | A1* | 3/2022 | Collins | G06F 8/51 |
| 2022/0131700 | A1* | 4/2022 | Shiner | H04L 9/3278 |
| 2022/0244892 | A1* | 8/2022 | Wushour | G06F 9/455 |

* cited by examiner

PROVIDING DEVICE-SPECIFIC FIRMWARE FOR EMBEDDED DEVICES

CROSS-REFERENCE TO RELATED APPLICATIONS

This application is a U.S. national phase application of pending International Application No. PCT/EP2022/064115 filed on May 24, 2022 and now published as WO/2022/248504, which designates the United States and claims priority from German Patent Applications No. 10 2021 113 585.0 filed on May 26, 2021. The disclosure of each of these patent applications is incorporated herein by reference.

The invention relates to providing embedded devices with firmware that implements a desired functionality of a particular individual instance of the embedded device.

STATE OF THE ART

Embedded devices are technical devices that make use of at least one programmable microcontroller or microcomputer to fulfill their function. The functionality of embedded devices is largely determined by the firmware with which the microcontroller or microcomputer is operated. Firmware updates can not only fix bugs and security vulnerabilities in the devices, but also provide new functionality to the extent that the hardware of the respective device is sufficient to do so. For many embedded devices, there is even alternative firmware from third-party suppliers available. For example, the functionality of WLAN routers can be significantly extended by the open-source OpenWRT firmware. With special derivatives of the OpenWRT firmware, the router can also become a node in a mesh network, for example.

As functionality becomes increasingly broad, the amount of firmware also grows, so the embedded device requires more memory and other hardware resources.

OBJECTIVE AND SOLUTION

It is therefore the objective of the invention to enable the implementation of a desired canon of functionality on an embedded device with a lesser hardware requirement.

This objective is solved according to the invention by methods according to main and subsidiary claims. Further advantageous embodiments result in each case from the subclaims referring back thereto.

DISCLOSURE OF THE INVENTION

In the context of the invention, a method for creating individual firmware for an embedded device was developed.

The method starts with providing a provisioning service with a library of predefined source code modules. The source code modules implement functionalities from a predefined catalog. In this process, a user of the embedded device is excluded from reading access to the source code modules. This can be achieved, for example, by providing the provisioning service on a server external to the user of the embedded device, and/or in a cloud.

In this context, functionalities (features) describe characteristics of the firmware in the broadest sense. They can be properties of the device that result from the firmware alone or from the interaction of the firmware with features of the hardware, with connected services and facilities, e.g., a cloud or the interconnection with other devices. In the broadest sense, these are properties that the device would not have without the corresponding implementation in the firmware.

The quality requirements for releases for productive use can be different (e.g. medical or industrial sector vs. multimedia applications at trade fairs) and differ in particular from requirements for releases in the context of the integration of embedded systems into plants during their development phase. The catalog can therefore sensibly provide functionalities (features) in different degrees of proven reliability. Examples: "beta" versions for the development phase of new plants or versions that are already running without problems for many users up to elaborately pre-tested "stable" versions.

The provisioning service receives, from at least one requester, a selection of functionalities to be provided in the individual firmware from the predefined catalog of available functionalities. One of these requesters may in particular be, for example, the user of the embedded device. However, alternatively or also in combination thereto, for example,

- the manufacturer of the device, who grants the user only a limited scope of functionalities according to his license;
- standardizers that enforce conformity of all devices operated with the firmware to specific standards; and/or
- authorities and agencies that selectively and individually grant or deny users the use of certain functionalities can occur as requesters. In the event of conflicts, any order of precedence can be specified. For example, an official specification can overrule a manufacturer's specification.

The provisioning service translates the selection of functionalities into instructions for compiling associated source code modules into machine code modules. For example, the machine code can include

- binary code (also referred to as object code) that can be directly executed on a microprocessor or microcontroller,
- intermediate code executable by an abstraction layer running on the microprocessor or microcontroller, such as Java bytecode executable on a Java runtime environment,
- script code of an interpreter language or
- a configuration of an FPGA or other programmable logic device.

The provisioning service executes, or causes to be executed, the instructions for compilation. For example, for compiling at least one source code module to a machine code module, a container or compute instance with a compiler can be created on a virtualized platform. For example, if compiling a plurality of source code modules is required according to the instructions, this can be at least partially parallelized by creating a corresponding number of containers or cloud instances to generate the firmware faster. This can be essential for the acceptance of the service. In particular, in a cloud environment, a great deal of performance can be mobilized in this way for compiling at once, for example to be able to complete the provisioning of a freshly arrived batch of a larger number of embedded devices as quickly as possible. Since such an event is comparatively rare, renting the power in a cloud at short notice is more economical than keeping the same power on hand in physical hardware all the time.

The provisioning service generates the individual firmware using the machine code modules created during compilation. This may include, for example, linking object code modules, and/or merging machine code modules into a SquashFS or other suitable file container. This individual firmware is communicated by the provisioning service to the embedded device user, and/or directly to the embedded device. The "detour" via the embedded device user may be considered, for example, if the embedded device is not networked and user interaction is required to deliver the individual firmware to the embedded device (such as on a storage medium).

It was recognized that, particularly in the case of embedded devices for industrial purposes, there is a conflict of objectives between the breadth of functionality provided on the one hand and the hardware requirements on the other. Each industrial user has relatively specific and narrow needs in terms of functionality. However, across the entire target group of users for the device, these needs add up to a fairly wide breadth. Firmware that covers this full breadth has much higher hardware requirements than firmware that covers only what each user needs. Thus, the need to develop firmware for a wider market has the effect that each user has to spend more money and energy on running hardware than would actually be necessary for the functionality actually used. This additional expense for each user is multiplied by the respective number of devices used.

Furthermore, over the lifetime of the hardware, the available breadth of functionality grows as the firmware continues to evolve. Thus, a firmware that covers the full breadth of functionality can, over time, outgrow the available hardware resources of certain existing devices with the result that these devices are cut off from the supply of current firmware versions from that point on. However, if a device-specific firmware contains only the functionalities that are actually needed, this point in time can be significantly delayed, and the latest firmware version can always be used for all functionalities that are actually used. In particular, the introduction of new functionalities that a specific user does not use at all no longer leads to the update to the new firmware exceeding the limits of the available hardware resources for this user.

This saves unnecessary costs for the replacement of hardware, especially in the context that extensions of the available functionality and fixes of security-relevant errors are often inextricably interwoven in firmware updates. Anyone who needs to be up to date in terms of security cannot avoid the update, and if the update is no longer executable on a particular older device, the device has to be replaced even though it is actually still functional. In the world of smartphones, this is a recurring expensive annoyance.

At the same time, for embedded devices for industrial purposes, it is usually not practical to leave it to the user to compile device-specific firmware with sparse hardware requirements. In the Linux world, it is well known to configure a kernel with a very high level of detail and compile from modules based on this configuration. In the industrial environment, however, this concept fails because the source code of the firmware contains the main part of the development work invested in the entire device. Since purchased standard hardware is usually used as the hardware platform for the embedded device, releasing the source code opens the door to unauthorized replicas and plagiarism of the embedded device. Furthermore, knowledge of the source code enables the user to make unauthorized changes to the firmware. For example, the user can "tickle" more performance out of the device than is actually intended by operating hardware components beyond their technical specification, such as by overclocking processors or operating radio modules with increased transmission power. If these overloaded components fail and the user makes a warranty claim, it is not always easy to prove that the user is responsible for the failure and has forfeited the warranty.

Furthermore, a user who does not program firmware full-time also does not have all the tools available that are required for compiling device-specific firmware. In particular, tools for compiling machine code for FPGAs are often available for a fee. By generating the device-specific firmware through a central provisioning service, the corresponding software licenses are only required at this point.

With the present method, the embedded device can be provided with individual firmware that only requires as much hardware as is really necessary for the respective desired functionality. The manufacturer retains control over the source code. Furthermore, access control is possible in terms of which requester can actually select and configure which functionalities from the catalog.

For example, embedded devices produced for an international market often contain universal radio modules, such as for WLAN or LoRaWAN, which cover the maximum required within this large market in terms of frequency range and transmission power. However, each user is only allowed to use these radio modules with the operating parameters that their respective regulatory authority grants them for frequency use. In the context of the present proceedings, for example, the configuration freedom of a German user may be limited to the scope covered by the general allocation for the frequencies used by the Federal Network Agency. If the user has been granted a chargeable individual allocation, such as an operational radio frequency outside the general allocation, the Federal Network Agency can release this frequency use for this user.

Furthermore, the present method also enables more flexible licensing models. The ever broader range of firmware functions already mentioned means that more and more development effort is accumulated in this firmware, which has to be refinanced through the sale of devices and firmware. The more functionality the firmware contains overall, the more expensively it has to be sold. Now that the firmware is created by the provisioning service, it is possible, for example, to set the price for the software license on the basis of the functionalities available in the respective individual firmware. The user can thus, for example, "slim down" the range of functions even further than is offered on the basis of the hardware requirements and get the firmware cheaper for it. At the same time, protection is provided against unauthorized use of functions that have not been acquired, because these functions that have not been acquired are simply not available in the inexpensive firmware, so they cannot be unlocked by simply manipulating the firmware. Furthermore, the firmware can also contain arbitrary software protection mechanisms and, for example, be tied to a specific embedded device with a specific serial number or other unique identification. For example, the firmware can be encrypted so that it can only be decrypted and started using a device-specific key that is permanently stored in the hardware. This key can belong to any symmetric or asymmetric cryptosystem.

Furthermore, customer-specific special developments/features can also be organized in this process. These functionalities (features) are then only visible and configurable for the ordering customer.

Compilation may in particular include, for example, selecting or deselecting functionalities from those implemented in a source code module or in a group of source code modules based on the selection made by the at least one requester. For example, the source code may provide that certain portions of the source code are compiled only under certain conditions. The more functionalities are deselected already at this point instead of only at runtime, the leaner the individual firmware is, especially with regard to its memory requirements. Furthermore, it is also better from a security point of view if the firmware contains as little program code as possible that relates to functionalities not used in normal operation. Such functionalities in particular can provide an unnecessary attack surface for attacks via radio or the Internet, because the user of the device may not even know that they are present and may not react if corresponding security vulnerabilities are made known. This problem is known from some virtual server offerings for end users, which run a hodgepodge of services ex works to minimize the effort for the user (and thus the support requests).

In a particularly advantageous embodiment, when translating to the instructions for compiling, in response to, for a subset of the functionalities from the selection received from the at least one requester, machine code that provides all the functionalities of the subset being obtainable

- both by compiling multiple source code modules, each of which implements single functionalities from the subset,
- as well as by compiling a single source code module in which all functionalities from the subset are implemented, compiling the single source code module is preferred. This tends to make the firmware leaner than if the same functionality is obtained from multiple source code modules. Furthermore, the susceptibility to errors is reduced. Typically, each source code module is extensively tested in the development process, at least on its own. However, such tests cannot cover all errors that can arise in the interaction of different source code modules, since the number of combinations of source code modules to be examined can become very large. Usually this can be solved by checks (of the version and the correct use of the interfaces) at run time. However, this way requires additional source code and corresponding resources on the embedded device. Such error sources can be efficiently reduced by not obtaining the used functionality from unnecessarily many individual source code modules.

In a further advantageous embodiment, when translating to the instructions for compiling, a selection among a plurality of ways to obtain machine code for providing a concrete functionality or a concrete subset of the functionalities from the selection received from the at least one requester is made using

- an optimization target for the resource requirements of the individual firmware, and/or
- a hardware configuration of the embedded device is carried out. For example, for certain tasks there is a choice between algorithms that require more computing power but therefore less memory and algorithms that require more memory but therefore less computing power. It can then depend, for example, on the interaction between the hardware platform used on the one hand and the overall selected functionalities on the other hand which resource is still abundantly available on the hardware platform and which resource is already almost used up.

In a further advantageous embodiment, translating, and/or generating the individual firmware, includes allocating the use of at least one hardware accelerator of the embedded device to the functionalities in the selection received from the at least one requester. Such a hardware accelerator may be, for example, a graphics processing unit (GPU), a digital signal processor (DSP), or an FPGA. In particular, priorities may be set that favor one functionality at the expense of another functionality when accessing the hardware accelerator. Especially for embedded systems which are used in large numbers, the hardware is typically dimensioned as tightly as possible given the task to be accomplished in order to save costs for the hardware as well as energy for its operation. Therefore, it is advantageous to direct the allocation of scarce hardware resources to achieve the greatest overall benefit with respect to the specific application. In the case of a camera module as an embedded device, for example, the choice of video codec used for transmitting a video data stream can determine whether more GPU power is used for encoding and the data stream is more compressed, or whether GPU power is saved and more bandwidth is consumed for transmitting the data stream.

In another advantageous embodiment, translating, and/or generating the individual firmware, includes allocating different hardware resources of the embedded device to different portions of the machine code for execution. For example, if a microprocessor of the embedded device has multiple cores, certain cores may be dedicated to execute certain portions of the machine code. In this way, for example, the execution of particularly time-critical tasks can be ensured without obstruction by other processes or threads.

For certain processing components, modular machine code cannot be realized or can only be realized with disproportionate restrictions, e.g. code for FPGAs. Here, the machine code that has the desired features must be generated in a single cast anyway. Usually, this means that the machine code must implement all conceivable features, which requires an unnecessarily large amount of resources (oversized FPGAs). With the described method, this can be solved.

In another advantageous embodiment, the provisioning service causes machine code modules, and/or the individual firmware, to be tested for proper operation. This may include, for example, causing the machine code module, and/or firmware as a whole, to receive inputs of the type received by the machine code module, and/or firmware, during normal operation of the embedded device. It can then be verified that the outputs of the machine code module, or firmware, are as expected. However, the machine code module, or the firmware, can also be given inputs that are not valid during normal operation of the embedded device and are therefore not expected in this form. This can include, for example, applying randomly generated inputs to the machine code module or the firmware ("fuzzing"). In particular, this can be used to test whether the firmware can be crashed by invalid inputs.

The test can

- be tested on instances of the target hardware—not for cloud providers
- can be tested on hardware simulation
- can be run per binary module on the correct hardware (e.g. the GPU that will be used later in the SOC).

Criterion: A test only makes sense at this point if its complexity goes beyond the module tests of the source code development phase.

Hardware related tests (e.g. function runs correctly on DSP or compression code runs correctly on codec hardware) should be pulled into the module and component tests of software development.

Furthermore, the test effort can be selected in such a way that the customer benefit, consisting of the fastest possible delivery and reliability, is optimally adapted to the needs.

In addition to the tests within the scope of the customer requirement, continuous testing can be performed in parallel. This can involve more elaborate tests, but also the testing of possible feature permutations according to a test plan. An important field for malfunctions in firmware with many selectable features is the interaction of the feature implementations. In order to find problems at an early stage, automated testing of combinations makes sense.

As previously explained, the provisioning service can be provided in particular, for example, on an external server or in a cloud. However, in a further advantageous embodiment, the provisioning service can also be executed at the user's premises of the embedded device without disclosing the source code to the user.

For this purpose, the source code modules are loaded in encrypted form into a secure enclave inaccessible to the user of the embedded device, which can be set up with the "Software Guard Extensions" on Intel processors, for example. The encrypted source code modules are decrypted within the secure enclave, and the decrypted source code modules are translated into machine code modules within the secure enclave.

In this way, the user of the embedded device can use his own hardware and, in particular, a device-specific firmware can be generated, for example, even in mobile use at a location where no Internet connection is available.

License tracking by the manufacturer can then be implemented, for example, by loading a monetary equivalent into the enclave, which can then be consumed offline with the generation of releases. This is somewhat analogous to prepaid electricity meters, where the customer loads a value credit onto a storage medium (such as a key) at the electricity provider and can then load from the storage medium to the meter at home in order to subsequently be able to purchase electricity to the corresponding extent.

The invention also provides a method for provisioning an embedded device.

In this method, an embedded device with a hardware platform is provided for the execution of a firmware. An individual firmware is created for this embedded device using the previously described method. This individual firmware is loaded onto the embedded device for execution on the hardware platform.

Here, an embedded device is selected with a hardware platform capable of executing firmware with a true subset of the functionalities from the given catalog, but not capable of executing firmware with all functionalities from the given catalog.

As previously explained, the generation of the device-specific firmware in this context means that the firmware does not require significantly more hardware resources than are absolutely necessary to execute the desired functionalities. Accordingly, the hardware can be sized smaller so that the desired functionalities can ultimately be executed at lower hardware and energy costs. This is particularly advantageous for embedded devices whose power supply is provided by batteries.

In another advantageous embodiment, in response to the individual firmware not functioning properly on the embedded device, an alternative firmware is requested from the provisioning service and loaded onto the embedded device. In this manner, the embedded device is restored to a functioning state.

Compared to the original firmware, the alternative firmware can in particular be, for example, a firmware with an older version status. Alternatively or in combination, this alternative firmware can implement a modified configuration of functionalities compared to the original firmware.

Ideally, malfunctions of individual firmware copies from a large number of embedded devices, or even from a large number of users of such embedded devices, can be collected at the provisioning service. This collected information allows patterns to be identified that facilitate narrowing down of possible faults. Thus, part of the effort for testing the firmware, which was previously the exclusive responsibility of the firmware manufacturer, is outsourced to the users. This not only reduces the effort on the part of the manufacturer, but also leads to a larger proportion of errors being detected. In particular, errors that only occur in connection with certain hardware platforms or only with certain constellations of inputs are more likely to be detected.

New software versions with bug fixes or new features can initially be delivered to only a few devices via the creation facility in a test phase. If the test phase runs smoothly, the release can be made available to all users.

The described procedure makes it easier to divide the firmware development process into two loops ("double firmware cycle"): In one loop, starting from a given set of functionalities (features) to be implemented, the implementation of the given functionalities in source code is optimized in a cycle consisting of requirement, build, test, delivery, operation and finally resulting new requirement. In the other loop, the set of functionalities to be selected from a large overall catalog for use on a concrete device is optimized in a cycle consisting of feature planning, implementation, building, delivery, operation, collection of data, and finally resulting adaptation of the feature planning. On the occasion of this optimization, opportunities for improvement and/or bug fixing may in turn become apparent, which can then be fed back into the source code development loop. For this purpose, a variety of data can be collected from request to commissioning to new request. This includes the history of requests for a device as well as manually entered additional info about any problems, but also monitoring and operating data of the device or firmware (log files, traces, etc.).

The search for patterns and analysis of errors can be performed on these data and all others in the system (data from tests, usage patterns of functionalities (features) from the catalog—i.e. frequency of usage, typical combinations).

This can be used to eliminate errors, but also to further develop the firmware pool as needed.

For example, unstable features, as well as unused features, can be removed from the pool.

Another benefit of the evaluation is the optimization of the firmware cycle, e.g. the provisioning speed and the required resources.

Frequent configurations or modules can be created in advance or their build artifacts can be saved on first request. The associated tests can be run in advance in case of workload gaps.

Furthermore, the user guidance of the provisioning service can be optimized: Popular, error-free tested or pre-generated configuration or features can be offered preferentially. Faulty options can be hidden from the offer.

Furthermore, new features can initially be offered to a small circle of users. If quality and demand allow, the circle can be automatically expanded.

The above two loops of the dual firmware cycle have a large overarching benefit: The activities of planning, implementation, configuration, build & test, deployment, operation, monitoring, debugging, troubleshooting are traditionally all sequentially interwoven, forming large blocks of work that are usually mutually exclusive. E.g., no new planning can flow in during the implementation phase. No new features can be implemented during the testing phase. After delivery, the user has to wait a long time for updates/bug fixes.

This is broken by the double firmware cycle explained above. Several, small fast cycles take the place of one large cycle. The cycle of request, build, test and delivery takes a time in the range of minutes. As a result, fine-grained implementation steps can flow in immediately. This corresponds to an update/bug fix cycle in the range of hours. By including the user in the testing process, testing and operations overlap. Control of the feature set is possible at short notice through tracking based on operational data/error messages/user behavior. The large cycle of planning, implementation, release, build . . . commissioning breaks down into much faster, small steps due to close observation of operations and the customer. E.g., rapidly growing usage of a new feature can lead to improved product planning and implementation in a very short time. On the other hand, if the usage of a feature in the field drops below a predetermined threshold, within an hour the feature can be removed from the catalog.

Thus, the characteristics of the process are qualitatively different in such a way that entirely new sales channels, business models and interaction with customers become possible (due to the flexibility in the firmware and the much shorter response times).

The methods may be computer-implemented, in whole or in part, and thus embodied in software. Thus, the invention also relates to a computer program having machine-readable instructions that, when executed on one or more computers, cause the computer or computers to execute the method to create individual firmware. In particular, in this context, containers, compute instances, and other execution environments on a virtualized platform in which machine-readable instructions can be executed are also considered computers.

Likewise, the invention also relates to a machine-readable data carrier and/or to a download product with the computer program. A download product is a digital product that is transferable via a data network, i.e. downloadable by a user of the data network, and that can be offered for sale for immediate download in an online store, for example.

Furthermore, a computer may be equipped with the computer program, with the machine-readable data carrier, or with the download product.

SPECIAL DESCRIPTION PART

Figure 2:
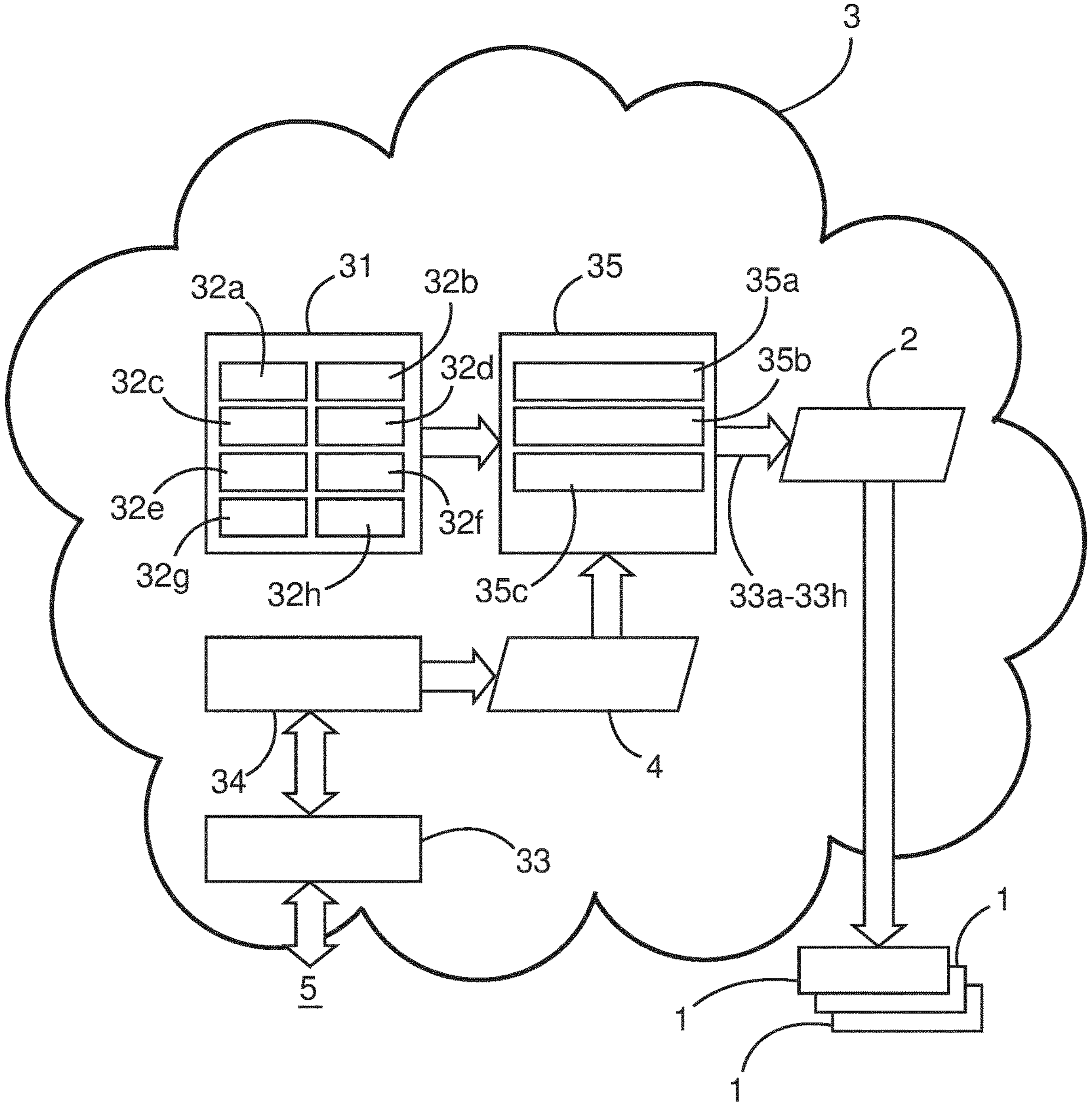
Figure 3:
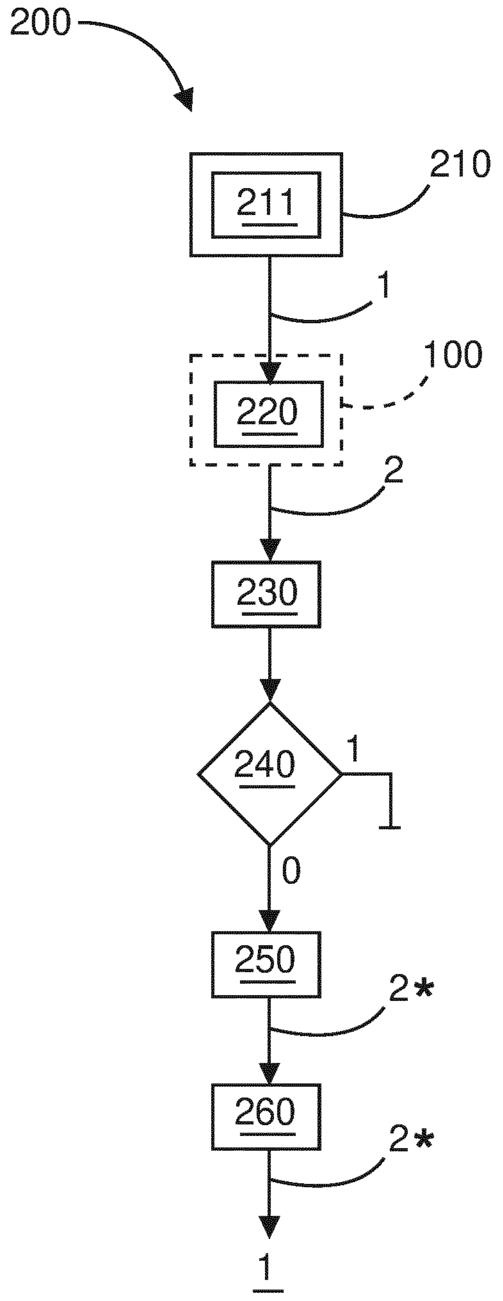

In the following, the subject matter of the invention is explained with reference to figures, without limiting the subject matter of the invention herein. It is shown:

FIG. 1: Exemplary embodiment of the method 100 for creating individual firmware 2 for an embedded device 1;

FIG. 2: Exemplary structure of a provisioning service 3:

FIG. 3: Example of embodiment of method 200 for provisioning an embedded device 1.

FIG. 1 is a schematic flowchart of an embodiment of the method 100 for creating individual firmware 2 for an embedded device 1.

In step 110, a provisioning service 3 is provided. This provisioning service 3 contains a library 31 of predetermined source code modules 32*a*-32*h* in which functionalities from a predetermined catalog are implemented. According to block 111, the provisioning service 3 may be provided in particular, for example, on a server external from the point of view of the user of the embedded device (1), and/or in a cloud.

In step 120, the provisioning service 3 receives, from at least one requester 5, a selection 4 of functionalities to be provided in the individual firmware 2 from the given catalog of available functionalities. This is typically a true subset of the total functionalities available in the catalog.

At step 130, the provisioning service 3 translates the selection 4 into instructions 6 for compiling associated source code modules 32*a*-32*h* into machine code modules 33*a*-33*h*. The union set of machine code modules 33*a*-33*h* provides the functionalities desired according to the selection 4.

According to block 131, functionalities may be selected and/or deselected from those functionalities implemented in a source code module 32*a*-32*h* or in a group of source code modules 32*a*-32*h* based on the selection 4 received from the at least one requester 5.

According to block 132, it may be determined whether a particular subset of the desired functionality is includable in the firmware both by compiling multiple source code modules 32*a*-32*h* and by compiling a single source code module 32*a*-32*h*. Thus, for example, if functions A and B are desired, a first source code module 32*a* may be compiled for function A and a second source code module 32*b* for function B. However, only a third source code module 32*c* can be compiled to provide both function A and function B. If such a situation exists (truth value 1), compiling a single source code module 32*c* may be preferred according to block 133.

According to block 134, an optimization objective for the resource requirements of the individual firmware 2, and/or a hardware configuration of the embedded device 1, may be used to select one option from a plurality of options for implementing a specific functionality or subset of functionalities.

According to block 135, already during translation 130 of selection 4 into instructions 6 for compilation, the use of at least one hardware accelerator of embedded device 1 may be allocated to the functionalities in selection 4 received from the at least one requester 5. According to block 136, different hardware resources of the embedded device 1 may be allocated to different portions of the machine code to be generated for execution.

In step 140, the instructions 6 for compilation are executed by the provisioning service 3 and/or caused to be executed.

If compilation is to take place at the user of the embedded device 1, according to block 141, the source code modules 32*a*-32*h* may be loaded in encrypted form into a secure enclave inaccessible to the user of the embedded device 1. According to block 142, the encrypted source code modules 32*a*-32*h* may then be decrypted within the secure enclave. According to block 143, the decrypted source code modules 32*a*-32*h* may then be translated into machine code modules 33*a*-33*h* within the secure enclave. According to block 144, for compiling at least one source code module 32*a*-32*h* into a machine code module 33*a*-33*h*, a container or compute instance 35*a*-35*c* with a compiler may be created on a virtualized platform 35.

In step 150, the provisioning service generates the individual firmware 2 using the machine code modules 33*a*-33*h* created during compilation.

According to block 155, analogous to block 135, the use of at least one hardware accelerator of the embedded device 1 can here be allocated to the functionalities in the selection 4 received from the at least one requester 5. According to block 156, analogous to block 136, different hardware resources of the embedded device 1 may be allocated to different portions of the machine code for execution.

In step 160, the generated individual firmware 2 is transmitted to the user of the embedded device 1.

FIG. 2 schematically shows an exemplary structure of the provisioning service 3. The provisioning service 3 communicates via an interface 33 with the at least one requester 5 and in doing so accepts a desired selection 4 of functionalities to be implemented in the individual firmware 2. Such selections 4 can be stored in particular, for example, in a configuration management 34.

The provisioning service 3 includes a library 31 of source code modules 32*a*-32*h*. The provisioning service 3 makes use of various containers and/or compute instances 35*a*-35*c* on a virtualized platform 35 to translate source code modules 32*a*-32*h* into machine code modules 33*a*-33*h*. From these machine code modules 33*a*-33*h*, the individual firmware 2 for a concrete embedded device 1 is created.

FIG. 3 is a schematic flowchart of an embodiment of method 200 for provisioning an embedded device 1.

In step 210, the embedded device 1 having a hardware platform is provided for executing a firmware. Here, according to block 211, an embedded device 1 having a hardware platform capable of executing a firmware with a true subset of the functionalities from the predetermined catalog, but not capable of executing a firmware with all functionalities from the predetermined catalog, is selected.

In step 220, an individual firmware 2 for the embedded device 1 is created using the previously described method 100. This individual firmware is loaded onto the embedded device 1 in step 230 for execution on the hardware platform.

In step 240 it is checked whether the individual firmware 2 on the embedded device 1 is working properly. If this is not the case (truth value 0), an alternative firmware 2* is requested from the provisioning service 3 in step 250 and loaded onto the embedded device 1 in step 260 to put the embedded device 1 back into a functioning state.

LIST OF REFERENCE SIGNS

- 1 embedded device
- 2 individual firmware for embedded device 1
- 2* alternative firmware
- 3 provisioning service
- 31 library of source code modules 32*a*-32*h*
- 32*a*-32*h* source code modules
- 33*a*-33*h* machine code modules
- 34 configuration management
- 35 virtualized platform
- 35*a*-35*c* containers and/or compute instances
- 4 selection of functionalities
- 5 requester
- 6 compile instructions
- 100 method for creating the individual firmware 2
- 110 providing the provisioning service 3
- 111 providing on external server/in a cloud
- 120 receiving selection 4 from requester 5
- 130 translating selection 4 to instructions 6
- 131 selecting and/or deselecting functionalities in module 32*a*-32*h*
- 132 checking whether functions can be realized by several or one module
- 133 preferring compiling only one module 32*a*-32*h*
- 134 applying an optimization target/hardware configuration
- 135 splitting a hardware accelerator between functionalities
- 136 assigning hardware resources to machine code parts
- 140 Executing/initiating the execution of the instructions 6
- 141 loading encrypted modules 32*a*-32*h* into secure enclave
- 142 decrypting the modules 32*a*-32*h* in the enclave
- 143 translating the modules 32*a*-32*h* in the enclave
- 150 generating the individual firmware 2
- 155 splitting a hardware accelerator between functionalities
- 156 assigning hardware resources to machine code parts
- 160 transmitting individual firmware 2 to user/device 1
- 200 method for provisioning an embedded device 1
- 5 210 providing the embedded device 1
- 220 creating the individual firmware 2
- 230 loading the individual firmware 2 onto embedded device 1
- 240 checking if individual firmware 2 works properly
- 250 requesting alternative firmware 2* from provisioning service 3
- 260 loading the alternative firmware 2* onto embedded device 1

The invention claimed is:

1. A method for provisioning an embedded device, the method including steps comprising:

providing the embedded device with a hardware platform for executing a firmware;

creating individual firmware for the embedded device by:

providing a provisioning service comprising a library of predetermined source code modules in which functionalities from a predetermined catalog are implemented, wherein a user of the embedded device is excluded from reading access to the source code modules;

receiving, from at least one requester, by the provisioning service, a selection of functionalities to be provided in the individual firmware from the predetermined catalog of available functionalities;

translating the selection of functionalities into instructions for compiling associated source code modules into machine code modules by the provisioning service such that a union set of machine code modules provides the functionalities from the selection;

executing, or causing to be executed, the instructions for compilation by the provisioning service;

generating the individual firmware using the machine code modules created during compilation by the provisioning service;

testing at least one of the machine code modules or the individual firmware using the provisioning service by applying inputs that are not valid during normal operation of the embedded device to the at least one of the machine code modules or the individual firmware;

only upon passing the testing, transmitting the individual firmware from the provisioning service to the user of the embedded device, or directly to the embedded device; and loading the individual firmware onto the embedded device for execution on the hardware platform, wherein the embedded device is selected having a hardware platform capable of executing firmware having a true subset of the functionalities from the predetermined catalog, but not capable of executing firmware having all of the functionalities from the predetermined catalog.

2. The method according to claim 1, wherein the translating comprises selecting or deselecting functionalities from the functionalities implemented in at least one of the predetermined source code modules or the associated source code modules or in another group of source code modules based on the selection received from the at least one requester.

3. The method according to claim 1, wherein, when translating in response to, for a subset of the functionalities from the selection received from the at least one requester, machine code that provides the subset of the functionalities being obtainable both by compiling several source code modules, each of which implements single functionality from the subset, as well as by compiling a single source code module, in which the subset of the functionalities are implemented.

4. The method according to claim 1, wherein the translating includes selecting between a plurality of ways to obtain machine code for providing a concrete functionality or a concrete subset of the functionalities from the selection received from the at least one requester using at least one of:

an optimization target for resource requirements of the individual firmware, or a hardware configuration of the embedded device.

5. The method according to claim 1, wherein the translating, or the generating the individual firmware, includes allocating a use of at least one hardware accelerator of the embedded device to the functionalities in the selection received from the at least one requester.

6. The method according to claim 1, wherein the translating, or the generating the individual firmware, includes allocating different hardware resources of the embedded device to different portions of machine code for execution.

7. The method according to claim 1, wherein the provisioning service further causes the machine code modules, or the individual firmware, to be checked for proper operation.

8. The method according to claim 1, wherein the provisioning service is provided on a server external from a viewpoint of the user of the embedded device, or in a cloud.

9. The method according to claim 1, wherein the provisioning service at least one of:

loads the predetermined source code modules in encrypted form into a secure enclave inaccessible to the user of the embedded device, decrypts the encrypted source code modules within the secure enclave, and translates the decrypted source code modules into machine code modules within the secure enclave.

10. The method according to claim 1, wherein causing the executing of the instructions includes creating a container or compute instance with a compiler on a virtualized platform for compiling at least one source code module into a machine code module.

11. The method according to claim 1, wherein in response to the firmware not functioning properly on the embedded device, an alternative firmware is requested from the provisioning service and loaded onto the embedded device.

12. A non-transitory computer-readable stored medium comprising machine-readable instructions that, when executed on one or more computers, cause the computer or computers to perform a method comprising:

providing a provisioning service comprising a library of predetermined source code modules in which functionalities from a predetermined catalog are implemented, wherein a user of an embedded device is excluded from reading access to the source code modules, wherein the embedded device has a platform configured to execute firmware having a true subset of the functionalities from the predetermined catalog, but not capable of executing firmware having all of the functionalities from the predetermined catalog;

receiving, from at least one requester, by the provisioning service, a selection of functionalities to be provided in an individual firmware from the predetermined catalog of available functionalities;

translating the selection of functionalities into instructions for compiling associated source code modules into machine code modules by the provisioning service such that a union set of machine code modules provides the functionalities from the selection;

executing, or causing to be executed, the instructions for compilation by the provisioning service;

generating the individual firmware using the machine code modules created during compilation by the provisioning service; and transmitting the individual firmware from the provisioning service to the user of the embedded device, or directly to the embedded device.

13. One or more computers having processors configured to carry out a process comprising:

providing a provisioning service comprising a library of predetermined source code modules in which functionalities from a predetermined catalog are implemented, wherein a user of an embedded device is excluded from reading access to the source code modules, wherein the embedded device has a hardware platform configured to execute firmware having a true subset of the functionalities from the predetermined catalog, but not capable of executing firmware having all of the functionalities from the predetermined catalog;

receiving, from at least one requester, by the provisioning service, a selection of functionalities to be provided in an individual firmware from the predetermined catalog of available functionalities;

translating the selection of functionalities into instructions for compiling associated source code modules into machine code modules by the provisioning service such that a union set of machine code modules provides the functionalities from the selection;

executing, or causing to be executed, the instructions for compilation by the provisioning service:

generating the individual firmware using the machine code modules created during compilation by the provisioning service; and transmitting the individual firmware from the provisioning service to the user of the embedded device, or directly to the embedded device.

* * * * *